(12) United States Patent
Ren et al.

(10) Patent No.: US 11,329,508 B2
(45) Date of Patent: May 10, 2022

(54) DISPLAY SUBSTRATE, DISPLAY DEVICE AND WIRELESS CHARGING METHOD

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Yanwei Ren, Beijing (CN); Yue Shan, Beijing (CN); Yu Feng, Beijing (CN); Min Liu, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

(*) Notice: Subject to any disclaimer, the term of this patent is extended or adjusted under 35 U.S.C. 154(b) by 150 days.

(21) Appl. No.: 16/640,211

(22) PCT Filed: Mar. 20, 2019

(86) PCT No.: PCT/CN2019/078838
§ 371 (c)(1),
(2) Date: Feb. 19, 2020

(87) PCT Pub. No.: WO2019/184780
PCT Pub. Date: Oct. 3, 2019

(65) Prior Publication Data
US 2020/0185964 A1 Jun. 11, 2020

(30) Foreign Application Priority Data
Mar. 30, 2018 (CN) .......................... 201810294193.4

(51) Int. Cl.
*H02J 50/10* (2016.01)
*G02F 1/1333* (2006.01)
(Continued)

(52) U.S. Cl.
CPC ............ *H02J 50/10* (2016.02); *G02F 1/1345* (2013.01); *G02F 1/13338* (2013.01);
(Continued)

(58) Field of Classification Search
CPC .. H02J 50/10; H04B 5/0037; G02F 2201/123; G02F 1/1345; G02F 1/13338; G06F 3/0412
See application file for complete search history.

(56) References Cited

U.S. PATENT DOCUMENTS

2012/0069506 A1 3/2012 Lai et al.
2014/0049882 A1 2/2014 Lin et al.
(Continued)

FOREIGN PATENT DOCUMENTS

CN 103376591 A 10/2013
CN 103594023 A 2/2014
(Continued)

OTHER PUBLICATIONS

First Office Action for Chinese Application No. 201810294193.4, dated Mar. 2, 2020, 8 Pages.
(Continued)

*Primary Examiner* — Jessica M Merlin
(74) *Attorney, Agent, or Firm* — Brooks Kushman P.C.

(57) ABSTRACT

A display substrate, a display device and a wireless charging method are provided. The display substrate includes: a display area and a peripheral area located outside the display area. The peripheral area includes a circuit binding area. The display substrate includes a base substrate and a wireless charging antenna disposed on the base substrate. The wireless charging antenna includes a power receiving coil and a connection lead. The connection lead is connected to the power receiving coil, and the power receiving coil is connected to the circuit binding area.

19 Claims, 6 Drawing Sheets

(51) Int. Cl.
    *G02F 1/1335* (2006.01)
    *G02F 1/1343* (2006.01)
    *G02F 1/1345* (2006.01)
    *G02F 1/1362* (2006.01)
    *G06F 3/041* (2006.01)
    *H02J 7/02* (2016.01)
    *H04B 5/00* (2006.01)
    *H01F 38/14* (2006.01)

(52) U.S. Cl.
    CPC .. *G02F 1/133512* (2013.01); *G02F 1/134309* (2013.01); *G02F 1/136286* (2013.01); *G06F 3/0412* (2013.01); *H02J 7/02* (2013.01); *H04B 5/0037* (2013.01); *G02F 2201/121* (2013.01); *G02F 2201/123* (2013.01); *H01F 38/14* (2013.01)

(56) References Cited

U.S. PATENT DOCUMENTS

| | | |
|---|---|---|
| 2014/0232325 A1 | 8/2014 | Jung et al. |
| 2014/0247547 A1 | 9/2014 | Jung et al. |
| 2015/0346887 A1 | 12/2015 | Cho et al. |
| 2017/0047361 A1* | 2/2017 | Xu .................... H01L 27/13 |
| 2017/0199603 A1 | 7/2017 | Xu et al. |
| 2017/0364175 A1 | 12/2017 | Park et al. |
| 2018/0067590 A1* | 3/2018 | Wang .................... G06F 3/0412 |
| 2018/0366083 A1 | 12/2018 | Lai et al. |
| 2020/0185964 A1 | 6/2020 | Ren et al. |

FOREIGN PATENT DOCUMENTS

| | | |
|---|---|---|
| CN | 103828123 A | 5/2014 |
| CN | 103997075 A | 8/2014 |
| CN | 104049801 A | 9/2014 |
| CN | 104252077 A | 12/2014 |
| CN | 105226780 A | 1/2016 |
| CN | 105304005 A | 2/2016 |
| CN | 105700745 A | 6/2016 |
| CN | 106098702 A | 11/2016 |
| CN | 106775176 A | 5/2017 |
| CN | 106842745 A | 6/2017 |
| CN | 107065253 A | 8/2017 |
| CN | 107526464 A | 12/2017 |
| CN | 108388037 A | 8/2018 |
| CN | 108508640 A | 9/2018 |
| KR | 20140046947 A | 4/2014 |

OTHER PUBLICATIONS

Second Office Action for Chinese Application No. 201810294193.4, dated May 13, 2020, 7 Pages.
International Search Report and Written Opinion for Application No. PCT/CN2019/078838, dated Jul. 1, 2019, 13 Pages.

* cited by examiner dividing a duration of one frame of display image into a display period, a touch period and a charging period, and performing a wireless charging during the charging period by using the wireless charging antenna — 801

DISPLAY SUBSTRATE, DISPLAY DEVICE AND WIRELESS CHARGING METHOD

CROSS-REFERENCE TO RELATED APPLICATIONS

This application is the U.S. national phase of PCT Application No. PCT/CN2019/078838 filed on Mar. 20, 2019, which claims priority to Chinese Patent Application No. 201810294193.4 filed on Mar. 30, 2018, which are incorporated herein by reference in their entireties.

TECHNICAL FIELD

The present disclosure relates to the field of display technology, and in particular to a display substrate, a display device, and a wireless charging method.

BACKGROUND

Wireless charging is a scientific and technological achievement related to lifestyle. Just like surfing the Internet through wireless means such as Bluetooth and Wireless-Fidelity (WIFI), the wireless charging will fundamentally change people's lifestyles and provide a new level of secure mobility and convenience.

SUMMARY

The present disclosure provides a display substrate, including: a display area and a peripheral area located outside the display area, where the peripheral area includes a circuit binding area, the display substrate includes a base substrate and a wireless charging antenna disposed on the base substrate, the wireless charging antenna includes a power receiving coil and a connection lead, where the connection lead is connected to the power receiving coil, and the power receiving coil is connected to the circuit binding area.

In some embodiments of the present disclosure, the power receiving coil has a rectangular spiral shape, the power receiving coil includes a first conductive line extending in a first direction and a second conductive line extending in a second direction, the first conductive line and the second conductive line are perpendicular to each other and alternately connected in an end-to-end manner.

In some embodiments of the present disclosure, the display substrate further includes a pixel electrode, where the first conductive line is disposed on a same layer as the pixel electrode and is made of a same material as the pixel electrode.

In some embodiments of the present disclosure, the display substrate further includes a touch electrode and a wiring, where the wiring includes a plurality of dummy wirings and a touch electrode wiring connected to the touch electrode, where at least one of the plurality of dummy wirings is used as the second conductive line.

In some embodiments of the present disclosure, the display substrate further includes a data line, where the wiring is disposed on a same layer as the data line and made of a same material as the data line, and the wiring is parallel to the data line.

In some embodiments of the present disclosure, the display substrate further includes a gate line, where the first conductive line is parallel to the gate line.

In some embodiments of the present disclosure, the display substrate further includes a common electrode, where the common electrode is reused as the touch electrode.

In some embodiments of the present disclosure, the first conductive line and the second conductive line are disposed on different layers, and the first conductive line and the second conductive line are connected through a via hole.

In some embodiments of the present disclosure, the display substrate further includes a black matrix; where the first conductive line and the second conductive line are disposed in an area covered by the black matrix.

The present disclosure also provides a display panel, including the above display substrate.

The present disclosure also provides a display device, including the above display panel.

In some embodiments of the present disclosure, the display device further includes: a main board, a flexible printed circuit board connector, and a battery, where the main board is connected to the flexible printed circuit board connector, the main board is connected to the battery, and the connection lead connected to the power receiving coil is connected to the flexible printed circuit board connector in the circuit binding area.

The present disclosure also provides a wireless charging method applied to the above display device. The wireless charging method includes: dividing a duration of one frame of display image into a display period, a touch period and a charging period, and performing a wireless charging during the charging period by using the wireless charging antenna.

BRIEF DESCRIPTION OF THE DRAWINGS

To better clarify technical solutions of embodiments of the present disclosure, drawings used in description of the embodiments are briefly introduced hereinafter. Apparently, the described drawings merely illustrate a part of the disclosed embodiments. A person of ordinary skill in the art can obtain other drawings based on the described drawings without any creative efforts.

DETAILED DESCRIPTION

To describe the technical solutions and the characteristics of embodiments of the present disclosure more clearly, the technical solutions of embodiments of the present disclosure are described clearly and completely in conjunction with drawings of the embodiments of the present disclosure. Apparently, the described embodiments are merely a part of rather than all embodiments of the present disclosure.

In related art, wireless charging technology has been applied to some mobile terminals (such as mobile phones). Taking a mobile phone using wireless charging as an example, wireless charging antenna in the mobile phone occupies a part of the space inside the mobile phone, which is detrimental to achieving a thin and lightweight mobile phone.

Figure 1:
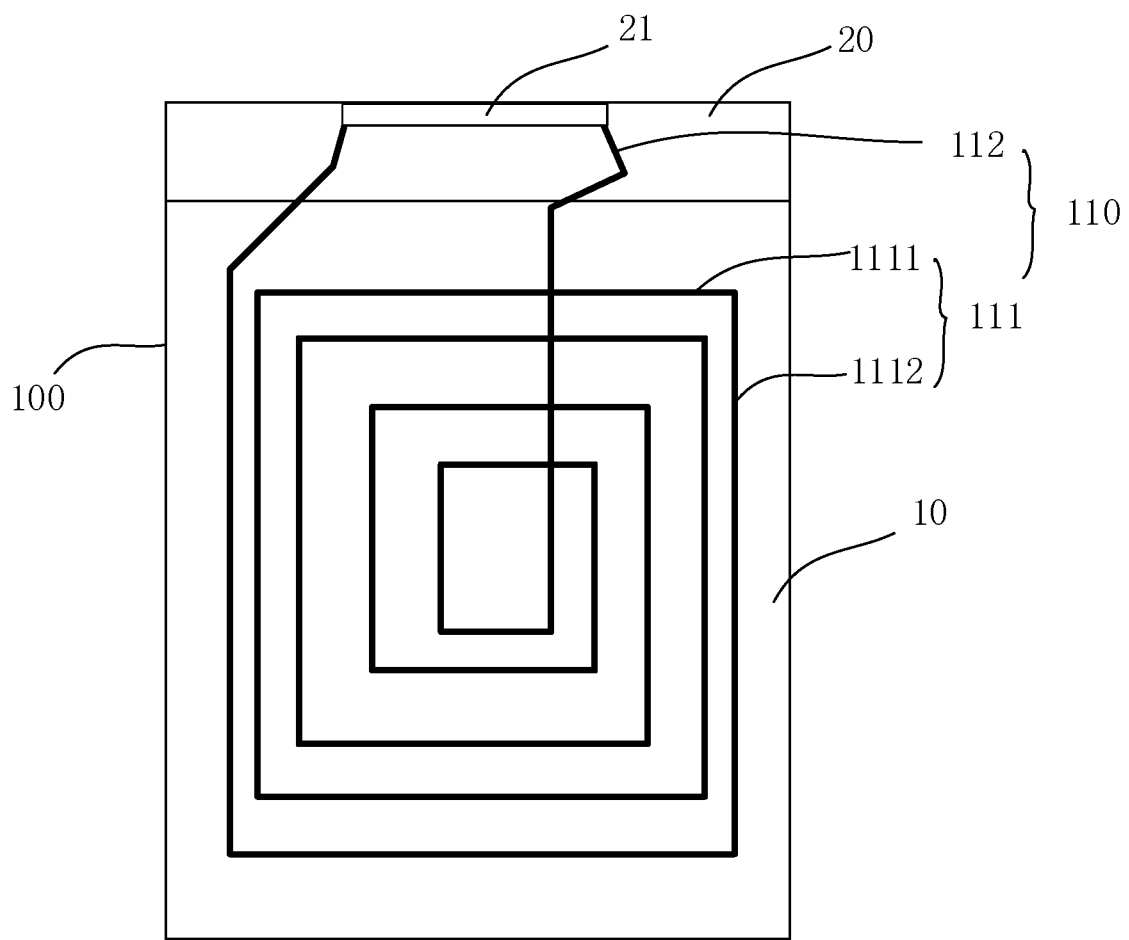
FIG. 1 is a schematic structural diagram of a display substrate provided by some embodiments of the present disclosure.

FIG. 1 is a schematic structural diagram of a display substrate provided by some embodiments of the present disclosure. Referring to FIG. 1, the display substrate includes a display area 10 and a peripheral area 20 (also referred to as a non-display area) located outside the display area 10. The peripheral area 20 includes a circuit binding area 21. The display substrate includes a base substrate 100 and a wireless charging antenna 110 disposed on the base substrate 100. The wireless charging antenna 110 includes a power receiving coil 111 and a connection lead 112. The connection lead 112 is connected to the power receiving coil 111, and the power receiving coil 111 is connected to the circuit binding area 21.

In the above embodiment of the present disclosure, the wireless charging antenna is integrated on the display substrate, so that there is no need to reserve space for the wireless charging antenna at other locations in the display device having the display substrate, and the wireless charging antenna does not occupy the internal space of the display device, thereby the thickness of the display device is reduced.

Figure 2:
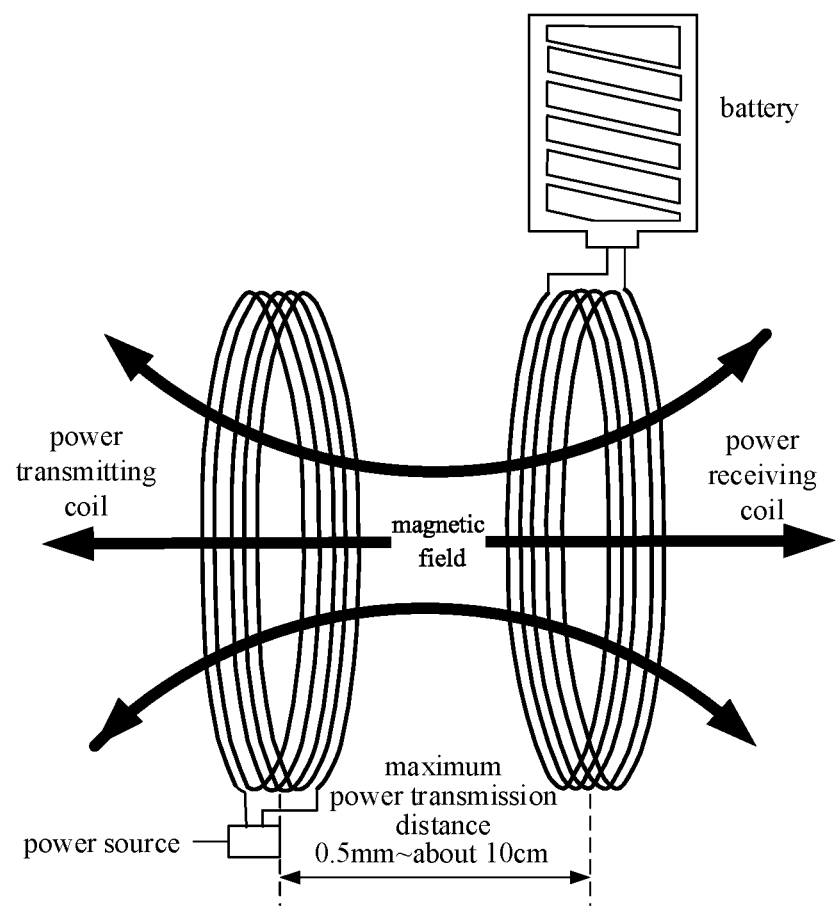
FIG. 2 is a schematic diagram of a charging principle of a wireless charging antenna provided by some embodiments of the present disclosure.

Referring to FIG. 2, the charging principle adopted by the wireless charging antenna in some embodiments of the present disclosure is: charging by using electromagnetic induction. For example, a power transmitting coil is provided at a power transmitting end, and a power receiving coil is provided at a power receiving end. The power transmitting coil is connected to a power source through a conductive line. The power source inputs AC power to the power transmitting coil. The power transmitting coil generates an electromagnetic signal (i.e., a magnetic field), and the electromagnetic signal induces a current in the power receiving coil and the current is transmitted to an electric device (such as a battery).

In the related art, the maximum power transmission distance of an electromagnetic-induction-type wireless charging antenna is about 0.5 mm to 10 cm. In the above embodiment of the present disclosure, a power receiving coil is disposed on the display substrate, the power receiving coil receives an electromagnetic signal generated by a power transmitting coil on an external charging device and generates a current. The current in the power receiving coil is transmitted to an electric device in a display device having the display substrate.

In the embodiment as shown in FIG. 1, the power receiving coil 111 is located in a display area 10 of the display substrate.

In other embodiments of the present disclosure, a part of the power receiving coil 111 is located in the display area 10 and a part of the power receiving coil 111 is located in the peripheral area 20.

In some embodiments, as shown in FIG. 1, the power receiving coil 111 has a rectangular spiral shape. The power receiving coil 111 includes a first conductive line 1111 extending in a first direction and a second conductive line 1112 extending in a second direction. The first conductive line 1111 and the second conductive line 1112 are perpendicular to each other and are alternately connected in an end-to-end manner, thereby forming a rectangular-spiral-shaped power receiving coil 111.

In other embodiments of the present disclosure, the power receiving coil 111 is of a circular shape, an elliptical shape (as shown in FIG. 2), or other shapes.

In some embodiments of the present disclosure, the first conductive line 1111 and the second conductive line 1112 are disposed on the same layer.

In some embodiments, the first conductive line 1111 and the second conductive line 1112 are disposed on different layers, and the first conductive line 1111 and the second conductive line 1112 are connected through a via hole.

In some embodiments, the first conductive line 1111 and the second conductive line 1112 are disposed on the same layer and are made of the same material.

The first conductive line 1111 and the second conductive line 1112 are disposed on the same layer and are made of the same material, so that the first conductive line 1111 and the second conductive line 1112 are formed through a single patterning process, thereby reducing the number of masks.

In some embodiments of the present disclosure, the display substrate is an array substrate, and the display substrate includes a plurality of gate lines and a plurality of data lines disposed perpendicular to each other. The plurality of gate lines and the plurality of data lines define a plurality of pixel regions.

In some embodiments, the first conductive line 1111 is parallel to a plurality of gate lines, and the second conductive line 1112 is parallel to a plurality of data lines.

In some embodiments of the present disclosure, the first conductive line 1111 is disposed near a gate line (for example, at a distance of 1.8 nm to 3 nm), and the second conductive line 1112 is disposed near a data line (for example, at a distance of greater than 2 nm to 14 nm). The first conductive lines 1111 and the second conductive lines 1112 are both disposed in an area covered by a black matrix, so as not to affect the normal display of the display device having the display substrate.

In some embodiments of the present disclosure, the display substrate is an array substrate, the display substrate includes a pixel electrode, and the first conductive line 1111 is disposed on the same layer as the pixel electrode and is made of the same material as the pixel electrode.

The first conductive line 1111 is disposed on the same layer as the pixel electrode and is made of the same material as the pixel electrode. The first conductive line 1111 and the pixel electrode can be formed in a single patterning process, which reduces the number of masks used in manufacturing a display substrate.

In some embodiments of the present disclosure, the display substrate is an array substrate, and the display substrate includes: a touch electrode and a wiring, and the wiring includes a plurality of dummy wirings and a touch electrode wiring connected to the touch electrode, where at least one of the plurality of dummy wirings serves as the second conductive line 1112.

In some embodiments, one touch electrode wiring is provided in the display substrate for every one or more pixel units. A dummy wiring is provided in the vicinity of a pixel unit for which no touch electrode wiring is provided, the dummy wiring is not connected to the touch electrode.

By providing the dummy wiring in the vicinity of the pixel unit for which the touch electrode wiring is not provided, a display substrate with an evenly distributed structure may be achieved.

In some embodiments of the present disclosure, at least one of the plurality of dummy wirings is used as the second conductive line 1112.

When at least one dummy wiring is used as the second conductive line 1112, it is not necessary to separately prepare the second conductive line 1112, which reduces the manufacturing cost of the display substrate.

In some embodiments of the present disclosure, the wiring is disposed on the same layer as the data lines and is made of the same material as the data lines, and the wiring is parallel to the data lines.

When the wiring and the data lines are disposed on the same layer and made of the same material, the wiring and the data lines are formed by a single patterning process, which reduces the number of masks used in manufacturing the display substrate and reduces production costs.

In some embodiments of the present disclosure, the display substrate further includes a common electrode, and the common electrode is reused as the touch electrode.

In some embodiments of the present disclosure, the display substrate is a display panel of a liquid crystal display substrate.

The structure of the display substrate in some embodiments of the present disclosure is described below.

Referring to FIG. 3 to FIG. 6, the display substrate in some embodiments of the present disclosure is a full-in-cell (FIC) touch display substrate. The display substrate includes a back substrate 301, a buffer layer 302, a gate insulation layer 303, an inter layer dielectric (ILD) 304, a source metal layer, a planarization layer (PLN) 306, a common electrode layer 307, a passivation layer (PVX) 308, and a pixel electrode layer 309 (i.e., pixel electrode).

Figure 3:
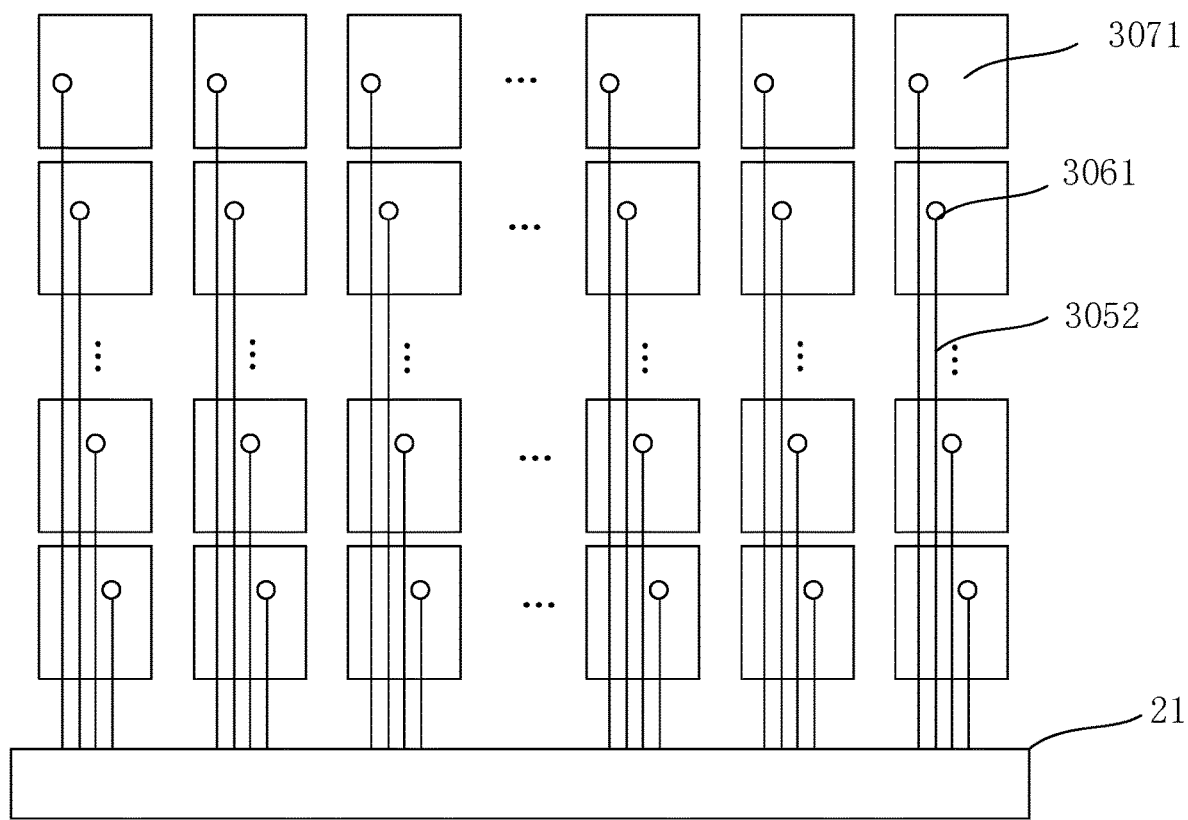
FIG. 3 is a schematic diagram of connections between touch electrodes and touch electrode wirings on a display substrate provided by other embodiments of the present disclosure.
Figure 4:
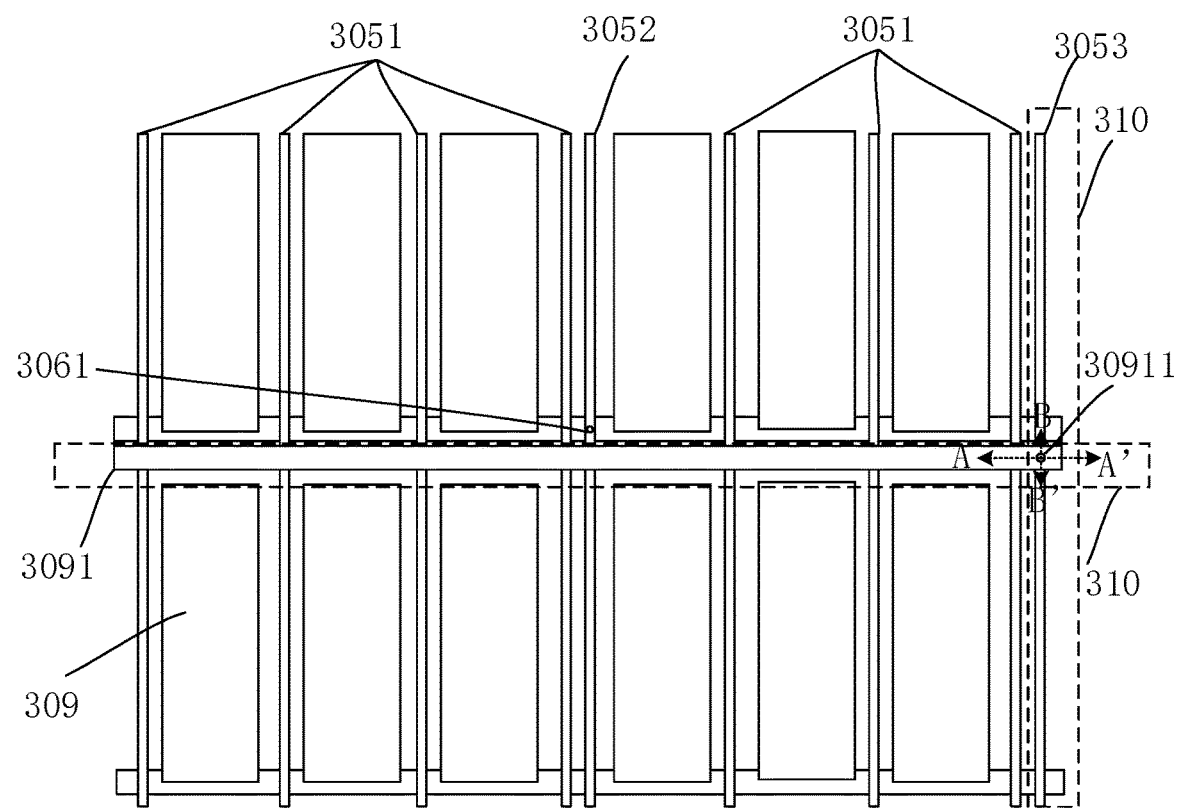
FIG. 4 is a schematic structural diagram of a pixel region on a display substrate provided by other embodiments of the present disclosure.
Figure 5:
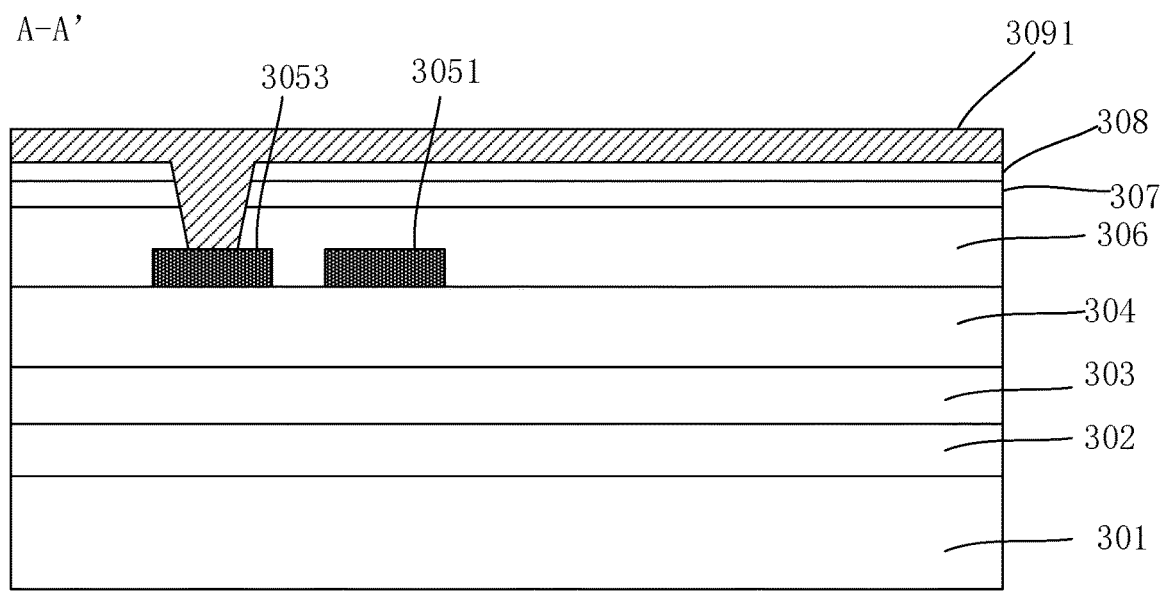
FIG. 5 is a schematic cross-sectional diagram of the display substrate along the direction A-A' in FIG. 4.
Figure 6:
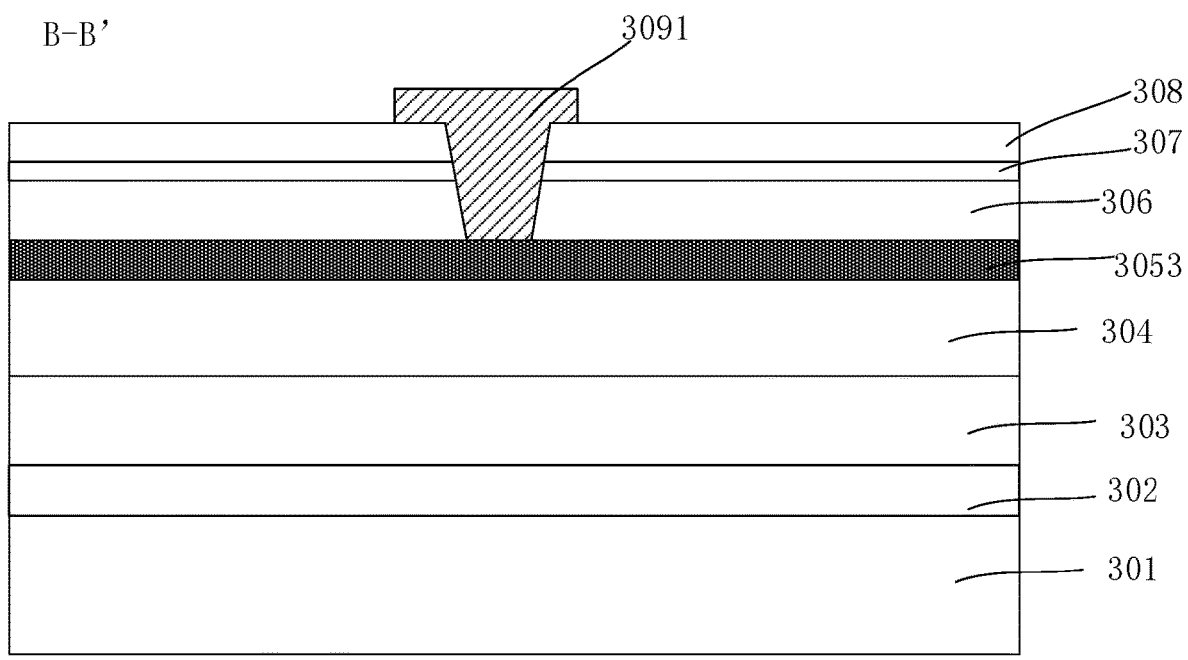
FIG. 6 is a schematic cross-sectional diagram of the display substrate along the direction B-B' in FIG. 4.

In some embodiments, as shown in FIG. 3 and FIG. 4, the common electrode layer 307 is divided into a plurality of block-shaped common electrodes 3071, and the plurality of common electrodes 3071 are reused as touch electrodes. The touch electrodes are connected to the touch electrode wirings 3052 through via holes 3061 in the planarization layer 306. The touch electrode wirings 3052 are connected to the circuit binding area 21 of the display substrate, and are connected to the main board through contact pads in the circuit binding area 21.

Referring to FIG. 4, in some embodiments of the present disclosure, the source metal layer includes: a wiring and data lines 3051. The wiring is arranged on the same layer as the data lines 3051 and are in parallel with the data lines 3051 and the wiring and the data lines 3051 are made of the same material, and the wiring is located near the data lines 3051. The wiring includes a touch electrode wiring 3052 connected to the touch electrode and a dummy wiring 3053 not connected to the touch electrode.

In some embodiments of the present disclosure, the dummy wiring 3053 is used as a vertical conductive line of the power receiving coil of the wireless charging antenna, that is, the second conductive line 1112 in the above embodiment, which is also referred to as the vertical conductive line. At the same time, a transversal conductive line 3091 of the power receiving coil of the charging antenna is formed on the pixel electrode layer, which is the first conductive line 1111 in the above embodiment.

In some embodiments, the display substrate further includes a black matrix 310, and the first conductive line 1111 and the second conductive line are disposed in an area covered by the black matrix 310.

In some embodiments, the transversal conductive line 3091 is disposed near a gate line, so that the transversal conductive line 3091 is located in an area covered by the black matrix, so that no light leakage phenomenon occurs.

The vertical conductive line and the transversal conductive line 3091 are connected through a via hole 30911, and the vertical conductive line and the transversal conductive line 3091 are alternately connected in an end-to-end manner, thereby forming a power receiving coil of the wireless charging antenna.

In FIG. 4, the section line A-A' is perpendicular to the section line B-B', and the section line A-A' and the section line B-B' both pass through the via hole 30911.

In some embodiments of the present disclosure, the dummy wirings of the touch electrodes are reused as the vertical conductive lines of the power receiving coil. The transversal conductive lines are disposed on the same layer as the pixel electrodes and are made of the same material as the pixel electrodes, so there is no need to add a mask used in manufacturing the display substrate, and cost is lower.

Figures 7, 8:
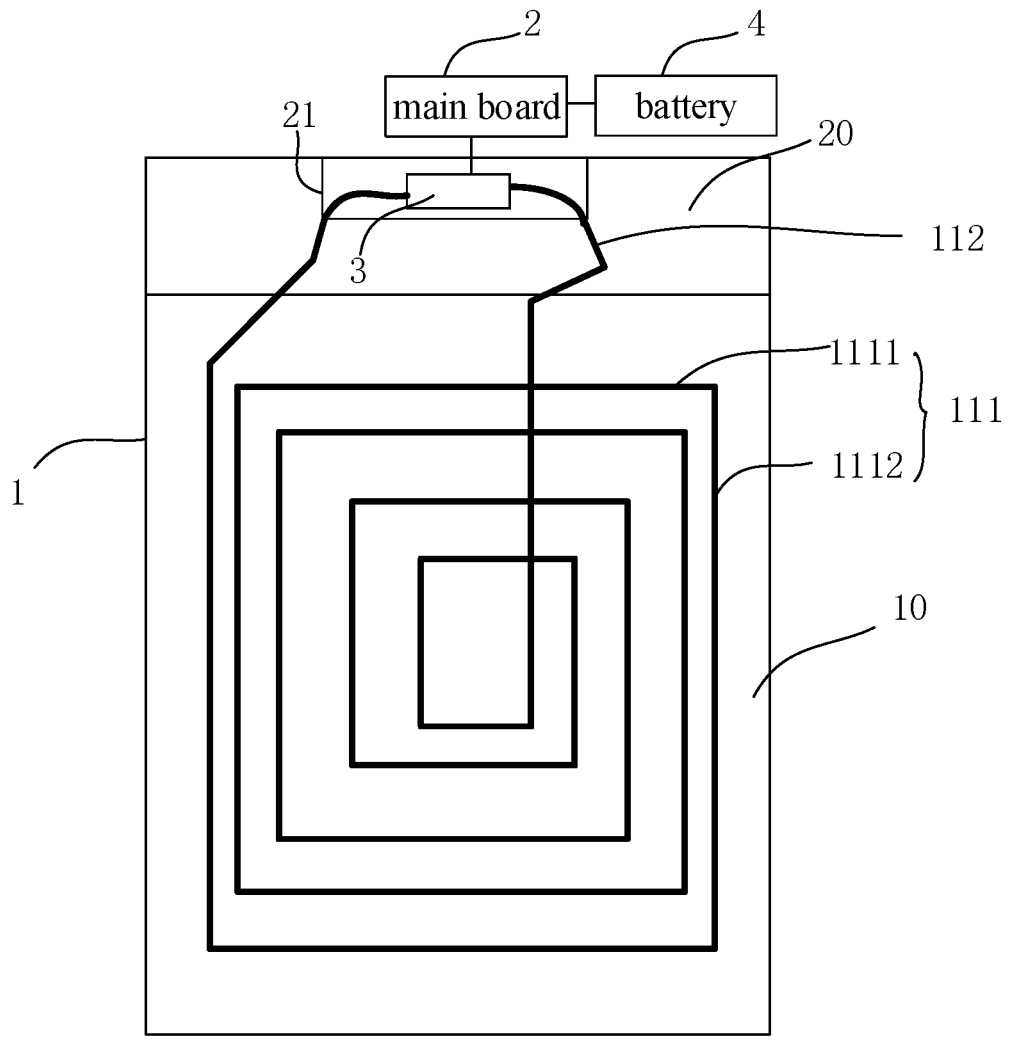
FIG. 7 is a schematic structural diagram of a display device provided by some embodiments of the present disclosure.
FIG. 8 is a flowchart of a wireless charging method provided by some embodiments of the present disclosure.

In some embodiments of the present disclosure, a display panel 1 is provided, as shown in FIG. 7. The display panel 1 includes a display substrate in any of the above embodiments.

In the above embodiment of the present disclosure, the display panel has a built-in wireless charging antenna, so that the manufacturer of the display device does not need to purchase and assemble the wireless charging antenna separately, thereby simplifying the process flow.

In some embodiments of the present disclosure, a display device is provided, as shown in FIG. 7. The display device includes the display panel 1 in any of the above embodiments.

In the above embodiments of the present disclosure, since the wireless charging antenna is built in the display panel, there is no need to reserve space for the wireless charging antenna in the display device, thereby reducing the thickness of the display device and providing more leeway for achieving ultra-thin models.

In some embodiments of the present disclosure, the display device is a mobile phone.

In some embodiments of the present disclosure, as shown in FIG. 7, the display device further includes a main board 2, a flexible printed circuit board connector 3, and a battery 4.

The main board 2 is connected to the flexible printed circuit board connector 3, the main board 2 is connected to the battery 4, the power receiving coil 111 is connected to the connection lead 112, and the connection lead 112 is connected to the flexible printed circuit board connector 3 in the circuit binding area 21. The current generated in the power receiving coil 111 due to electromagnetic induction is input to the main board 2 through the flexible printed circuit board connector 3. The main board 2 processes the received current and inputs the processed current to the battery 4 to charge the battery 4.

In some embodiments of the present disclosure, a wireless charging method applied to the above display device is provided. As shown in FIG. 8, the wireless charging method includes a step 801.

The step 801 includes: dividing a duration of one frame of display image into a display period, a touch period and a charging period, and performing a wireless charging during the charging period by using the wireless charging antenna.

In the above method embodiment, while the wireless charging antenna is built in the display substrate, the display function and the touch function of the display device are not affected.

In some embodiments, the wireless charging antenna is controlled to be turned on during the charging period to perform charging via the wireless charging antenna, and the wireless charging antenna is controlled to be turned off during other periods (display period and touch period) to prevent charging, so as not to affect the display function and touch function of the display device.

Unless otherwise defined, the technical or scientific terms used in the present disclosure shall have the ordinary meanings understood by those of ordinary skill in the art to which the present disclosure belongs. The terms "first", "second", and the like used in this disclosure do not indicate any order, quantity, or priority, but are only used to distinguish different components. Expressions such as "connection" or "connected" are not limited to denote physical or mechanical connections, but may include electrical connections, whether direct or indirect.

The above descriptions merely describe some implementations of the present disclosure. It is appreciated, modifications and improvements may be made by a person of ordinary skill in the art without departing from the principle of the present disclosure.

What is claimed is:

1. A display substrate, comprising:
a display area and a peripheral area located outside the display area, wherein the peripheral area comprises a circuit binding area, the display substrate comprises a base substrate and a wireless charging antenna disposed on the base substrate, the wireless charging antenna comprises a power receiving coil and a connection lead, wherein the connection lead is connected to the power receiving coil, and the power receiving coil is connected to the circuit binding area,
wherein the power receiving coil has a rectangular spiral shape, the power receiving coil comprises a first conductive line extending in a first direction and a second conductive line extending in a second direction, the first conductive line and the second conductive line are perpendicular to each other and alternately connected in an end-to-end manner,
wherein the display substrate further comprises a pixel electrode, the first conductive line is disposed on a same layer as the pixel electrode and is made of a same material as the pixel electrode.

2. The display substrate according to claim 1, further comprising: a touch electrode and a wiring, wherein the wiring comprises a plurality of dummy wirings and a touch electrode wiring connected to the touch electrode, wherein at least one of the plurality of dummy wirings is used as the second conductive line.

3. The display substrate according to claim 2, further comprising: a data line, wherein the wiring is disposed on a same layer as the data line and made of a same material as the data line, and the wiring is parallel to the data line.

4. The display substrate according to claim 3, further comprising: a gate line, wherein the first conductive line is parallel to the gate line.

5. The display substrate according to claim 2, further comprising: a common electrode, wherein the common electrode is reused as the touch electrode.

6. The display substrate according to claim 1, the first conductive line and the second conductive line are disposed on different layers, and the first conductive line and the second conductive line are connected through a via hole.

7. The display substrate according to claim 1, further comprising: a black matrix; wherein the first conductive line and the second conductive line are disposed in an area covered by the black matrix.

8. A display panel, comprising the display substrate according to claim 1.

9. A display device, comprising the display panel according to claim 8.

10. The display device according to claim 9, further comprising: a main board, a flexible printed circuit board connector, and a battery, wherein the main board is connected to the flexible printed circuit board connector, the main board is connected to the battery, and the connection lead connected to the power receiving coil is connected to the flexible printed circuit board connector in the circuit binding area.

11. A wireless charging method, applied to the display device according to claim 10, comprising:
dividing a duration of one frame of display image into a display period, a touch period and a charging period, and performing a wireless charging during the charging period by using the wireless charging antenna.

12. A wireless charging method, applied to the display device according to claim 9, comprising:
dividing a duration of one frame of display image into a display period, a touch period and a charging period, and performing a wireless charging during the charging period by using the wireless charging antenna.

13. The display substrate according to claim 1, further comprising: a touch electrode and a wiring, wherein the wiring comprises a plurality of dummy wirings and a touch electrode wiring connected to the touch electrode, wherein at least one of the plurality of dummy wirings is used as the second conductive line.

14. The display substrate according to claim 13, further comprising: a data line, wherein the wiring is disposed on a same layer as the data line and made of a same material as the data line, and the wiring is parallel to the data line.

15. The display substrate according to claim 14, further comprising: a gate line, wherein the first conductive line is parallel to the gate line.

16. The display substrate according to claim 13, further comprising: a common electrode, wherein the common electrode is reused as the touch electrode.

17. The display substrate according to claim 1, further comprising: a black matrix; wherein the first conductive line and the second conductive line are disposed in an area covered by the black matrix.

18. A display substrate, comprising:
a display area and a peripheral area located outside the display area, wherein the peripheral area comprises a circuit binding area, the display substrate comprises a base substrate and a wireless charging antenna disposed on the base substrate, the wireless charging antenna comprises a power receiving coil and a connection lead, wherein the connection lead is connected to the power receiving coil, and the power receiving coil is connected to the circuit binding area,
wherein the power receiving coil has a rectangular spiral shape, the power receiving coil comprises a first conductive line extending in a first direction and a second conductive line extending in a second direction, the first conductive line and the second conductive line are perpendicular to each other and alternately connected in an end-to-end manner,
wherein the display substrate further comprises a touch electrode and a wiring, the wiring comprises a plurality of dummy wirings and a touch electrode wiring connected to the touch electrode, wherein at least one of the plurality of dummy wirings is used as the second conductive line.

19. A wireless charging method, applied to a display substrate, wherein the display substrate comprises a display area and a peripheral area located outside the display area, wherein the peripheral area comprises a circuit binding area, the display substrate comprises a base substrate and a wireless charging antenna disposed on the base substrate, the wireless charging antenna comprises a power receiving coil and a connection lead, wherein the connection lead is connected to the power receiving coil, and the power receiving coil is connected to the circuit binding area, wherein the wireless charging method comprises: dividing a duration of one frame of display image into a display period, a touch period and a charging period, and performing a wireless charging during the charging period by using the wireless charging antenna.

\* \* \* \* \*